United States Patent [19]

Vogt

[11] Patent Number: 4,557,014

[45] Date of Patent: Dec. 10, 1985

[54] METHOD AND APPARATUS FOR PROCESSING SIMILAR WORKPIECES OF VARYING SHAPE, POINTS OF CONTOUR AND DIMENSION

[75] Inventor: Norman H. Vogt, Lewiston, Mich.

[73] Assignee: William T. Sevald, Bellaire, Mich.

[21] Appl. No.: 556,146

[22] Filed: Nov. 29, 1983

Related U.S. Application Data

[63] Continuation-in-part of Ser. No. 373,441, Jul. 30, 1982.

[51] Int. Cl.$^4$ ............................................... A22C 17/00
[52] U.S. Cl. .......................................... 17/1 R; 17/52
[58] Field of Search .................. 17/54, 53, 52, 63, 1 R, 17/23, 11, 24

[56] References Cited

U.S. PATENT DOCUMENTS

| | | | |
|---|---|---|---|
| 3,663,991 | 5/1972 | Harben, Jr. | 17/11 |
| 3,916,484 | 11/1975 | Kennedy | 17/23 X |
| 3,940,998 | 3/1974 | Sourby et al. | 17/52 X |
| 4,118,777 | 10/1978 | Wallace | 17/23 X |
| 4,291,435 | 9/1981 | Hartmann | 17/54 X |

Primary Examiner—Willie G. Abercrombie
Attorney, Agent, or Firm—William T. Sevald

[57] ABSTRACT

Class workpieces, such as hog carcasses, of varying dimension, points of contour and shape are moved from storage on an overhead rail conveyer hanging vertically head down and are driven through break-up stations at a constant speed. Driven side belts moving at the same speed contact the carcasses in the work stations and hold them steady against oscillation. A saw or tool at each station is supported on a lead screw assembly for up and down movement. The lead screw is directionally and incrementally driven by a lead screw assembly at each station to locate each saw to perform work on the carcass. The saws at each station successively cut off the shoulder, loin-belly and ham as the carcasses move through the stations. The shoulder, loin-belly and ham fall by gravity onto conveyers when cut off by the saws. Manual means are provided to control the position of the saws as observed by the operator. Automatic means include activating an intelligent vision camera at each station to identify the location of the desired work point on each carcass for each saw. Camera data is calculated against the last prior location of the saw and a signal developed and fed to the lead screw mechanisms to drive the lead screws to locate the tools or saws at the desired work points on each carcass at each station whereupon the carcass moves through the saw at each station at the desired point of cut.

8 Claims, 10 Drawing Figures

METHOD AND APPARATUS FOR PROCESSING SIMILAR WORKPIECES OF VARYING SHAPE, POINTS OF CONTOUR AND DIMENSION

This application is a continuation in part of application Ser. No. 373,441, filed Apr. 30, 1982, by said Norman H. Vogt, for Method and Apparatus For Processing Similar Workpieces of Varying Shape, Points of Contour and Dimension.

BACKGROUND OF THE PRESENT INVENTION

In the meat industry, cattle, hogs, sheep, etc. are slaughtered, the head and viscera removed, and the carcass split lengthwise through the backbone leaving the sides joined by skin and tissue at points along the back. A gambrel is inserted between the back leg bone and the tendon near the foot or hoof. The gambrel is then suspended on a wheeled trolley hanging the carcasses vertically downward from the feet and moved along an overhead rail to a cold storage station, usually a room at 32° F. to 42° F. where the carcasses become stiff with cold as well as preserved by refrigeration.

In the prior art, the vertically hanging carcasses are later removed from the gambrels and placed in a horizontal position to break them up into shoulder, loin-belly and ham portions. These cuts are handled manually in the prior art. This prior art horizontal break-up is labor intensive with workmen manually using saws and knives. The change of position for vertical to horizontal of the heavy carcasses is time consuming and difficult, hard work and therefore expensive.

If the cuts are made as desired, they command a higher price in the marketplace; if not, there are two reduced price portions; one that was cut off too long and the one that was cut off too short. The length, weight and unwieldiness of the carcass, human disinterest, fatigue, arm-reach, and lack of skill contribute to financially improper cuts.

The most important element of the break-up is accuracy of cut at the desired point. Accuracy means profits and inaccuracy means losses of those profits. Depending on market prices for certain cuts, there are times when the ham is cut short and the loin-belly cut long and vice-versa. This is also true of the shoulder-loin-belly points of cut. Modifying the point of cut is based on customer demand and the relatively small modifications result in a large increase in profits.

SUMMARY OF THE PRESENT INVENTION

There is no change of the carcasses from the vertical storage position to a horizontal work position in the present apparatus. The break-up of the carcasses into the various cuts is controlled automatically or by manual control. When severed, the cuts fall by gravity into chutes leading to side conveyers. Simplicity is an essence of the invention.

An overhead rail leads from the slaughter location into and from cold storage as in the prior art. In the present invention an extension of the overhead conveys the vertically hanging carcasses through the break-up stations in the vertical position past saws which make the cuts which are located by video-computer controlled servomechanisms or manually to make accurate desired cuts. An endless driven chain at the extended overhead rail has spaced lugs which pick up each trolley suspending a carcass and moves it past the cameras and saws at regularly spaced intervals and at a constant speed. Driven vertical back-up belts, traveling at the same speed as the chain hold the carcasses steady during the cuts at the desired points on the carcasses. When severed, the shoulder falls to a conveyer leading to a shoulder work-up sub-station; the loin-belly cut falls to a conveyer leading to a loin-belly work-up sub-station; and the ham falls to a conveyer leading to a ham work-up sub-station. No human labor is expended in the entire break-up and disposition of the several cuts in the automatic operation. In the manual control the only difference is the positioning of the saws by switch control.

The carcasses are uniformly spaced apart by the distance between trollies, such as six feet. The trollies and the conveyor belts move the carcasses at a fixed speed past the strobe lights, cameras and saws, such as six feet in 3.6 seconds. The camera up-stream of the shoulder-cut saw produces an image including a point of severance, such as the space between the second and third ribs at the shoulder. The camera up-stream of the loin-belly cut saw produces an image including a point of severance, such as a point on the aitch or hip bone adjacent its socket joint at the backbone. The camera up-stream of the ham saw produces an image including a point of severance such as at the stifle joint for a shankless ham; at the end of the V-bone for a short shank ham; and at the "closed joint" or upper knee joint for a standard shank ham. In the manual operation the points of cut are located by eye and the saws moved up or down by push button switch control.

Hogs vary in length from 48 to 82 inches as they hang vertically from the gambrels. Thus there are different vertical distances between where the desired cuts are made on an 82 inch hog and on a 48 inch hog. This distance difference is largest at the shoulder cut, less at the loin-belly cut and least at the ham cut.

As hog carcasses vary in length between 48 inches and 82 inches on the average, it is found that when cutting from the bottom to the top as the carcasses hang vertically, the shoulder cut-off saw requires an up and down travel distance of about 24 inches, the loin-belly cut-off saw a distance of about 12 inches, and the ham cut-off saw a distance of about 6 inches. This is occasioned by the fact that a short 48 inch carcass does not hang down as far as along 82 inch carcass. In other words, the cuts on a short 48 inch carcass are made relatively higher than the cuts on a long 82 inch carcass. Thus the saws must have sufficient up and down travel to compensate for the differential of points of cut over the spread of the vertical hang-down length of the long and short carcasses from the overhead rail.

In the automatic embodiment, the carcass images of the cameras for shoulder, loin-belly and ham cuts are processed and the ruler distance at, up, or down relative to the last prior position of the saws is computed and corresponding signals control the lead screw assemblies controling the saws prior to each carcass encountering each saw as it travels horizontally while hanging vertically. The signal to the lead screw assemblies causes the lead screws to stand or rotate to elevate or lower their respective saws by the signals. This locates each saw at the point on each carcass to make the desired cut on each carcass regardless of the length of the hog and the distance variation up or down from carcass to carcass.

In the manual embodiment, a black-line guide lamp is mounted on the saw with the black line indicative of the level of the saw. The guide lamp illuminates the open side of the carcass giving the user projected light to distinguish carcass features. The black-line projected by the lamp is the absence of light. The line is focused at the level of the saw. When the user causes the lead screw mechanism to raise or lower the saw, the blackline moves an equal distance. Thus it is only necessary for the user to lay the black line on the point of cut as the saw has the same vertical position.

DETAILED DESCRIPTION OF THE ILLUSTRATED EMBODIMENTS

Figure 2:
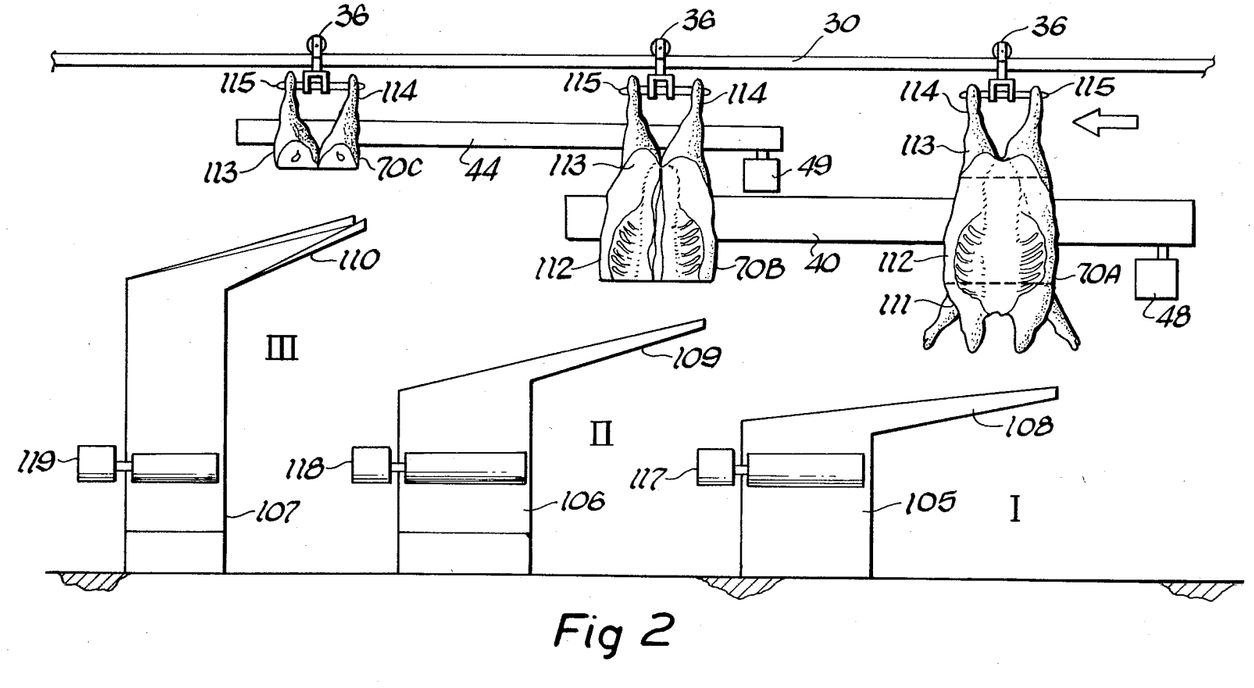
FIG. 2 is a schematic face elevational view taken on the line 2—2 of FIG. 1 showing carcasses and points of cuts.
Figure 3:
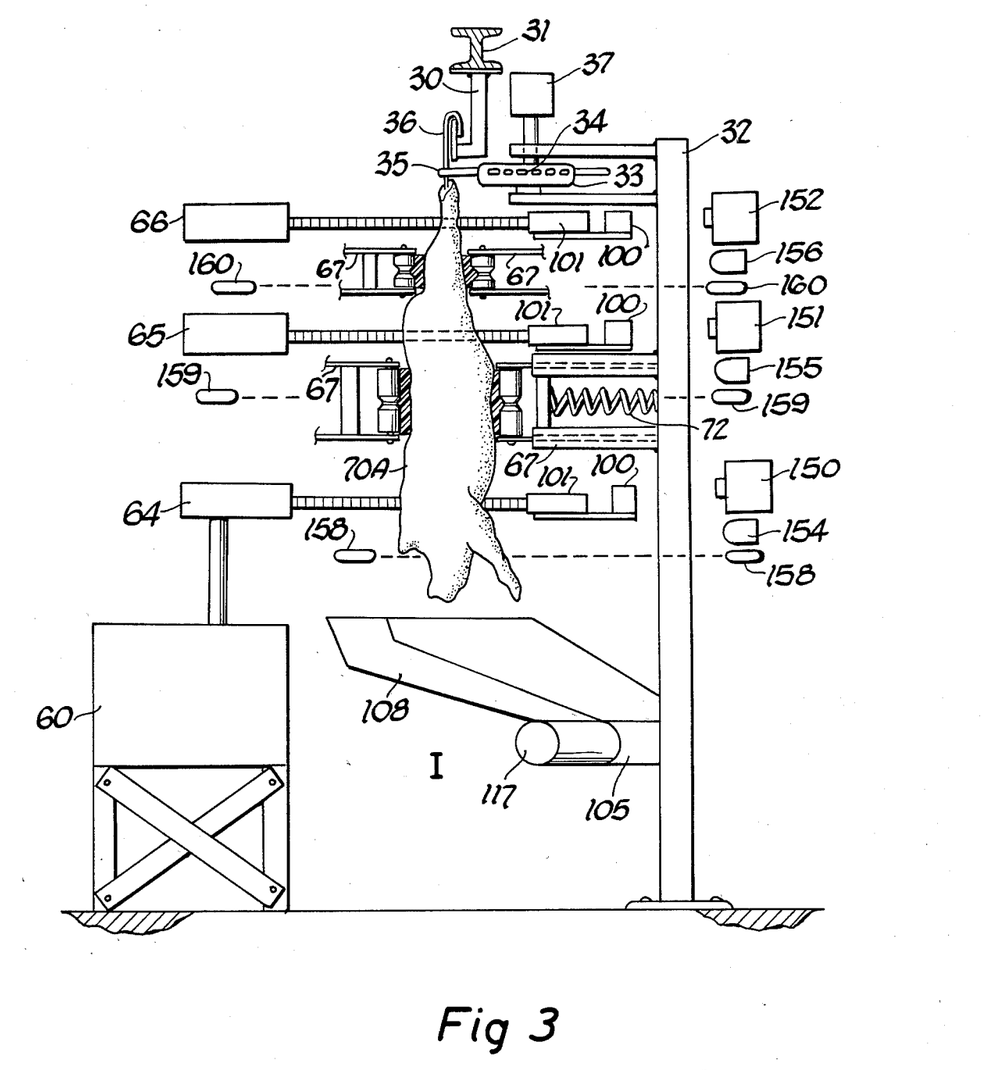
FIG. 3 is a schematic end elevational view taken in the direction of the arrows 3 of FIG. 1.
Figure 4:
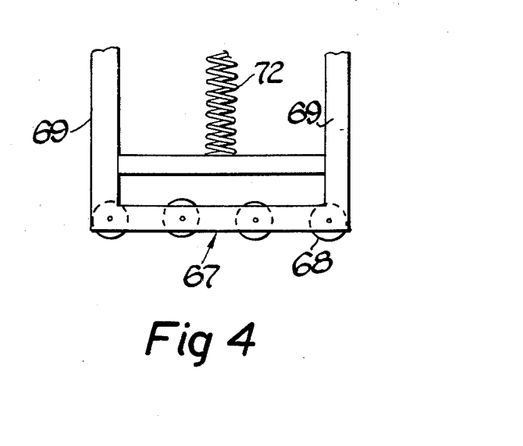
FIG. 4 is a detail view showing a mounting of conveyor backup rollers shown in FIGS. 1 and 3.
Figure 5:
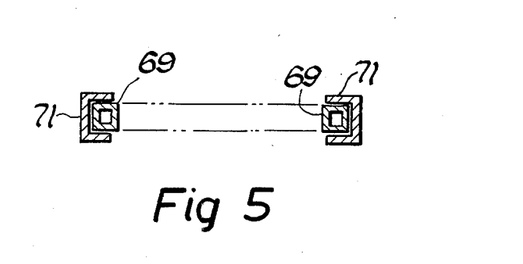
FIG. 5 is a detail view showing channels receiving the mounting of FIG. 4.

Referring now to the drawings wherein like reference numerals refer to like and corresponding parts, the apparatus of the invention comprises an overhead rail 30, FIGS. 2, 3, suspended from beams 31. A stanchion 32 supports an endless chain sprocket drive 33 over the length of the rail 30. The chain 34 has spaced arms 35. Trolleys 36 ride the rail 30. The arms 35 contact the trolleys 36 spacing the trolleys 36 on the rail 30 with the motion of the chain 34 moving the trolleys along the rail 30. A controlled speed motor or selsyn 37 drives the chain.

A first pair of endless belts 40 and 41 lie below the rail 30, FIGS. 1, 2 and 3. The belts 40, 41 lie vertically with their flat portions 42, 43 opposed and spaced from one another. A second pair of like endless belts 44, 45, overlap the first pair of belts at a higher level. The belts 44, 45 lie vertically with their flat portions 46, 47 opposed and spaced. Controlled speed motors or selsyns 48, 49, 50, 51 drive the belts via the drive rollers 52, 53, 54, 55. Track rollers 56 support the first pair of belts 40, 41 and track rollers 57 support the second pair of belts 44, 45. The selsyns drive the chain and the belts at the same selected speed.

Figure 1:
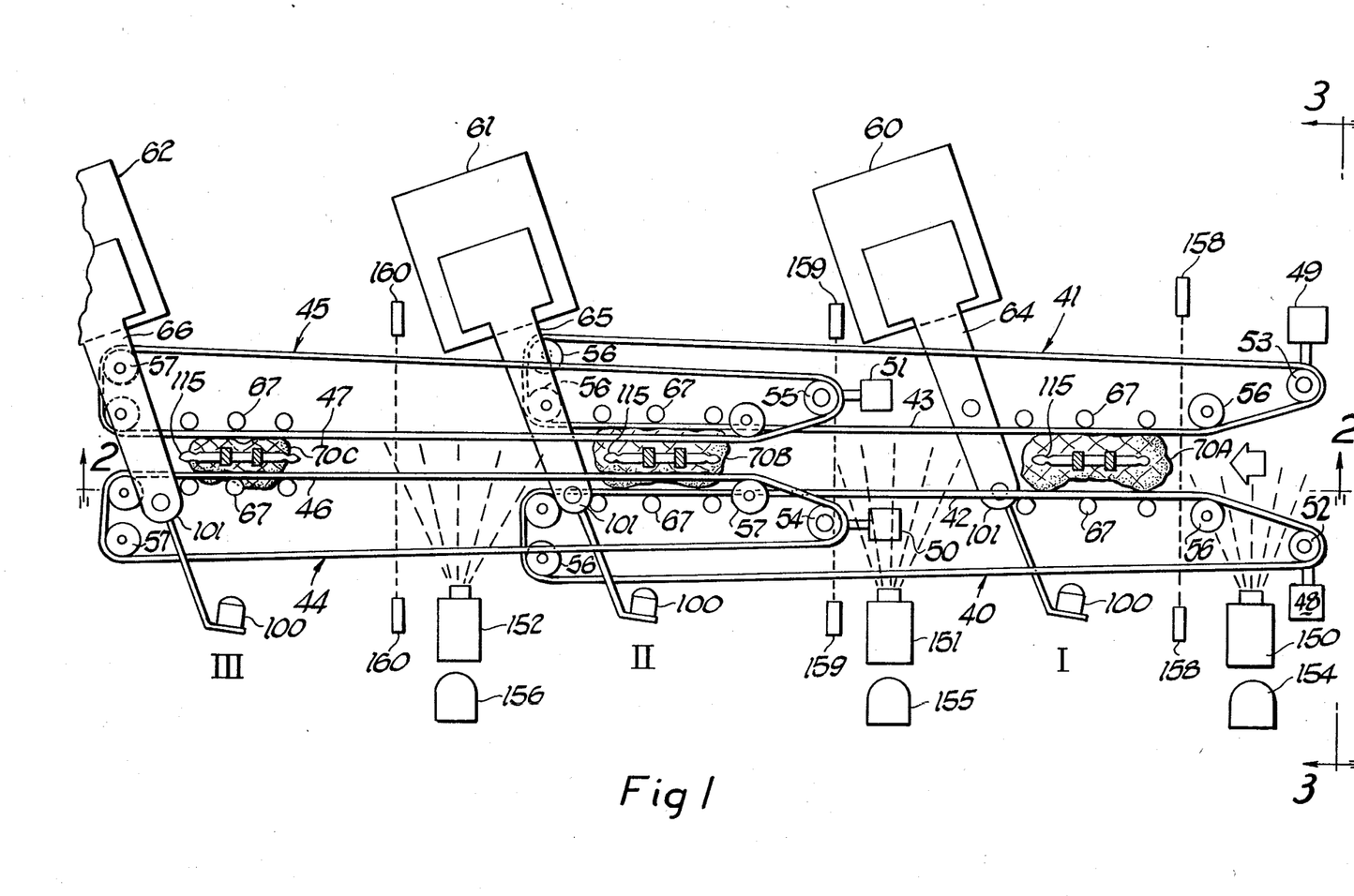
FIG. 1 is a schematic top plan view of the conveyors, and the disposition of the saws, strobes, cameras, and servo-mechanisms with the trolley arm in cross-section above the gambrel.

Lead screw drive mechanisms 60, 61, 62, FIGS. 1 and 3, vertically movably support saws 64, 65, 66 respectively with the saws extending past the opposed belt portions 42, 43, 46, 47, so that carcasses 70 hanging from the trolleys 36 traveling between the opposed belt portions encounter the saws 64, 65, 66.

Spring-pressed roller assemblies 67, FIGS. 1-5, bear against the belt pressing portions 42, 43, 46, 47 to hold the carcasses steady and vertical as they pass through the saws 65, 65, 66. Each roller assembly 67 has multiple spaced rollers 68 on a frame 69 slidably received in channels 71 mounted on stanchions 32. A spring 72 between the stanchion 32 and the frame 69 urges the roller assemblies 67 against the belt pressing portions 42, 43 and 46, 47 in opposition to one another respectively to secure the carcasses 70 as they pass through the saws 64, 65, 66 which are driven constantly by internal electric motors.

Each lead screw assembly 60, 61, 62 includes a frame 80, a top cross member 81 and a bottom cross member 82 having central aperture 83. A bearing 84 is mounted on the cross member 81 and a bearing 85 is mounted on the cross member 82. A lead screw 86 is disposed between and secured against vertical movement by the bearings 84, 85. The bottom of the lead screw 86 has a female spline coupling 87, not shown. A lead screw nut 88 surrounds the lead screw 86. A flange 89 is bolted to the nut 88. The flange 89 has slide bearings 90 such as four at 90 degrees spacing. Slide rods 91, such as four, lie in the slide bearings 90 and are supported by brackets 92. Support posts 94, such as four, are connected to the flange 89 and rise through openings 93 in the cross member 81 to their upper ends. A saw 64 is mounted on the upper ends of the posts for up and down movement with the posts 94 and nut 88 on the lead screw 86.

The lead screw 86 is bi-directionally rotated by a drive 95 made by Electroid Co. Div. of Valcore Engineering Corp. of springfield, N.J. The drive 95 has a vertical male spline shaft 96 fitting in the female spline coupling 87 of the lead screw 86. A motor 97 powers the drive 95 continuously. The drive 95 includes a clutch for driving in the rotational direction of the motor 97 and a clutch for driving in the reverse rotational direction of the motor 97; both clutches are normally disengaged. A brake downstream from the clutches is normally in braked condition to hold the driven element—lead screw stationary. The clutches are selectively controlled for direction of drive and the brake is selectively released from normal braking condition as hereinafter set forth.

An "up" bottom 98 operates a normally open switch which controls the circuits to the drive. When the "up" bottom 98 is depressed against its return spring, it closes the switch in the circuits whereby the clutch transfers and engages drive from the motor 97 to drive the lead screw 86 in the direction to run the nut 88 upwardly and at the same time the brake is released.

A "down" button operates a normally open switch which controls the circuits to the drive. When the "down" button 99 is depressed against its return spring, it closes the switch in the circuits whereby the clutch transfers and engages drive from the motor 97 to drive the lead screw 86 in the direction to run the nut 88 downwardly and at the same time the brake is released.

In both the "up" and "down" direction of the nut 88, upon the release of either button operated switches, the return spring opens the control switches to the circuits whereupon the clutches return to their normal non-driving condition and at the same time the brake returns to its normal braking position holding the lead screw against movement. These elements are further detailed in conjunction with FIG. 10, wiring diagram.

In conjunction with the "up" and "down" button operation described, a black-line guide lamp 100 extends from a mounting on the end 101 of the saws 64, 65, 66 and shines on the interior of the carcasses with the light blocked off at the center of its lens describing a black-line at the same vertical level as the saw will cut as the line is projected at the same vertical level of the saws 64, 65, 66 as they raise and lower the same distance with the raising and lowering of the head screw nut 88.

Figure 7:
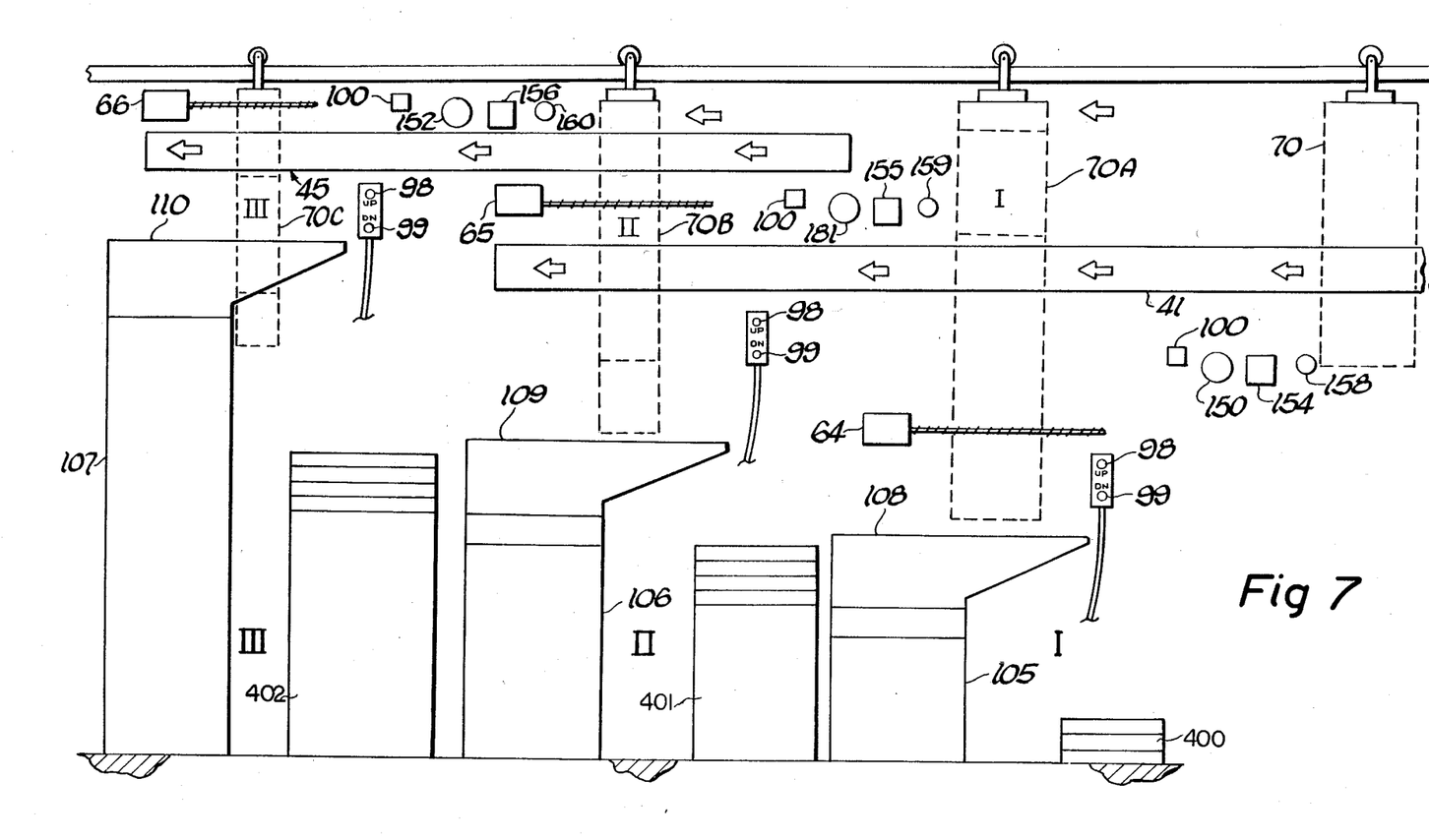
FIG. 7 is a front schematic assembly drawing showing the overhead rail, trolleys, gambrels, carcasses of different size in dotted lines, saws, front back-up belts, strobes, cameras, photo cells, side conveyors, manual operator stands, manual control switches, and black-line guide lamps.
Figure 8:
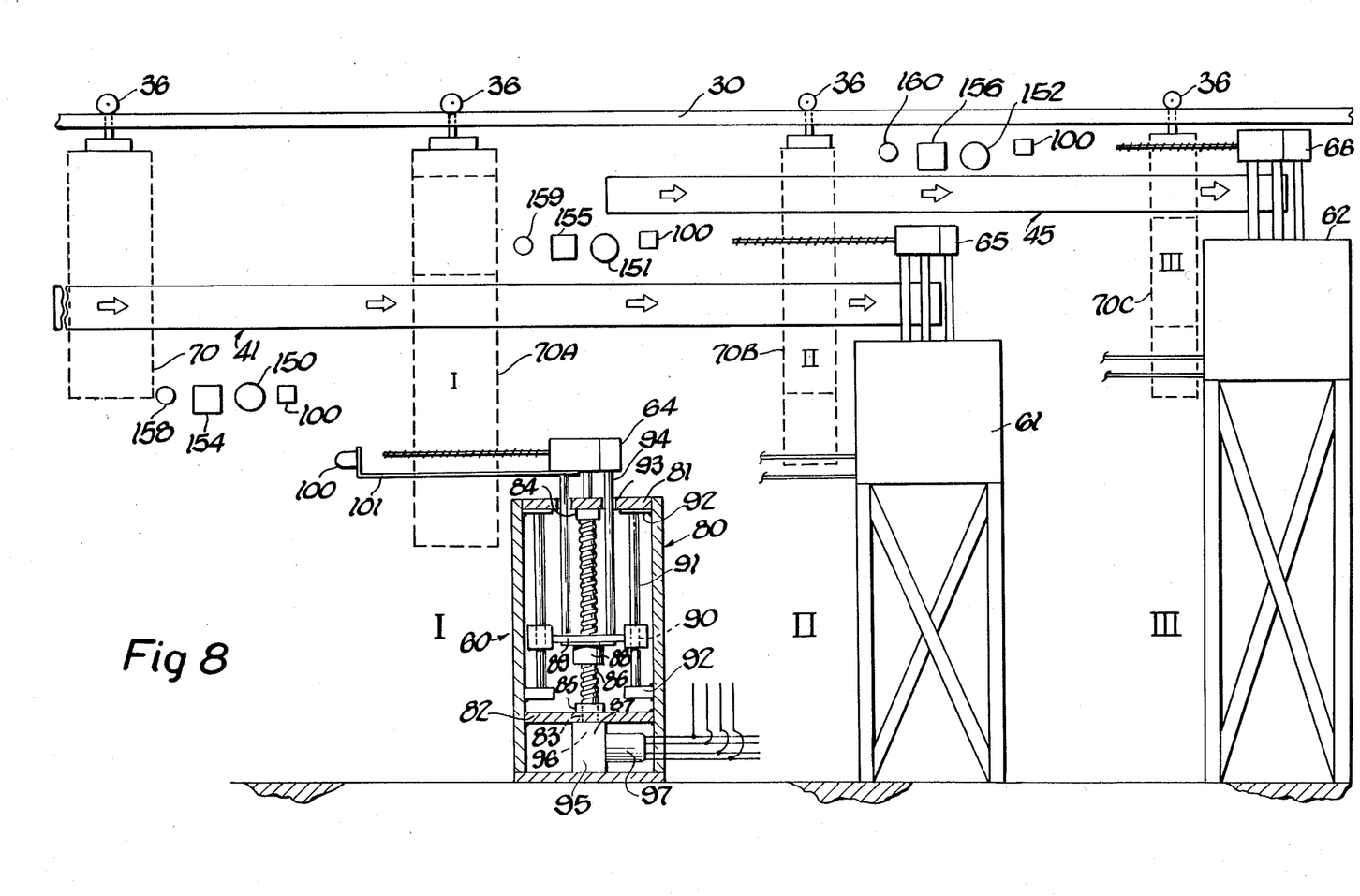
FIG. 8 is a back schematic assembly drawing showing the overhead rail, trolleys, gambrels, carcasses of different size in dotted lines, saws, rear back-up belts, strobes, cameras, photo cells, lead screw mechanisms supporting the saws, and mounting for the black-line guide lamp.

Referring to FIG. 7, stands 400, 401 and 402 are provided at the shoulder cut station, the loin-belly cut station, and the ham cut station respectively. The stands position the operator of the up and down switches to locate his view substantially level on the cut to be made under manual control in conjunction with adjusting the location of the black line indication of the position of the saws relative to the feature of the carcass at which the cut is to be made.

Thus the black-line provides the manual operator of the "up" and "down" buttons with an advance indication of the desired positions of the saws 64, 65, 66 to make the cuts at the desired points on the carcasses as the black-line is focused on the carcasses well ahead of each saw thereby allowing the manual operator to move the black-line to the desired point of cut by depressing the "up" or "down" button which also moves the saws 64, 65, 66 to intercept and cut the carcasses 70 at the desired point. Automatic up and down movement of the saws is described later herein.

In both the manual and automatic control of the position of the saws, FIG. 2, conveyors 105, 106, and 107 with or without their respective chutes 108, 109, and 110, are located respectively in the fall area of the shoulder 111 when cut off from the loin-belly 112; in the fall area of the loin-belly 112 when cut off from the ham 113; and in the fall area of the ham 113 when cut off from the feet 114, which feet 114 are later stripped from the gambrels 115 from which they hang as the trolleys move down-stream on the overhead rail 30. The conveyors 105, 106, 107 move their respective cut-off portions to shoulder, loin-belly and ham work-up stations for trimming as commercially dictated. The conveyors 105, 106, 107 run continuously and are driven by motors 117, 118 and 119 respectively.

In the manual control the operator has the visual capability to see all the features of the carcass and the judgment to select the features at which to make the desired cuts. The manual control enables him to use the "up" and "down" buttons to bring the black-line to the selected feature. And because the height of the saw is tied directly to the height of the black-line, the saw is brought to the height at which to make the desired cut.

Wiring Diagram

Figure 10:
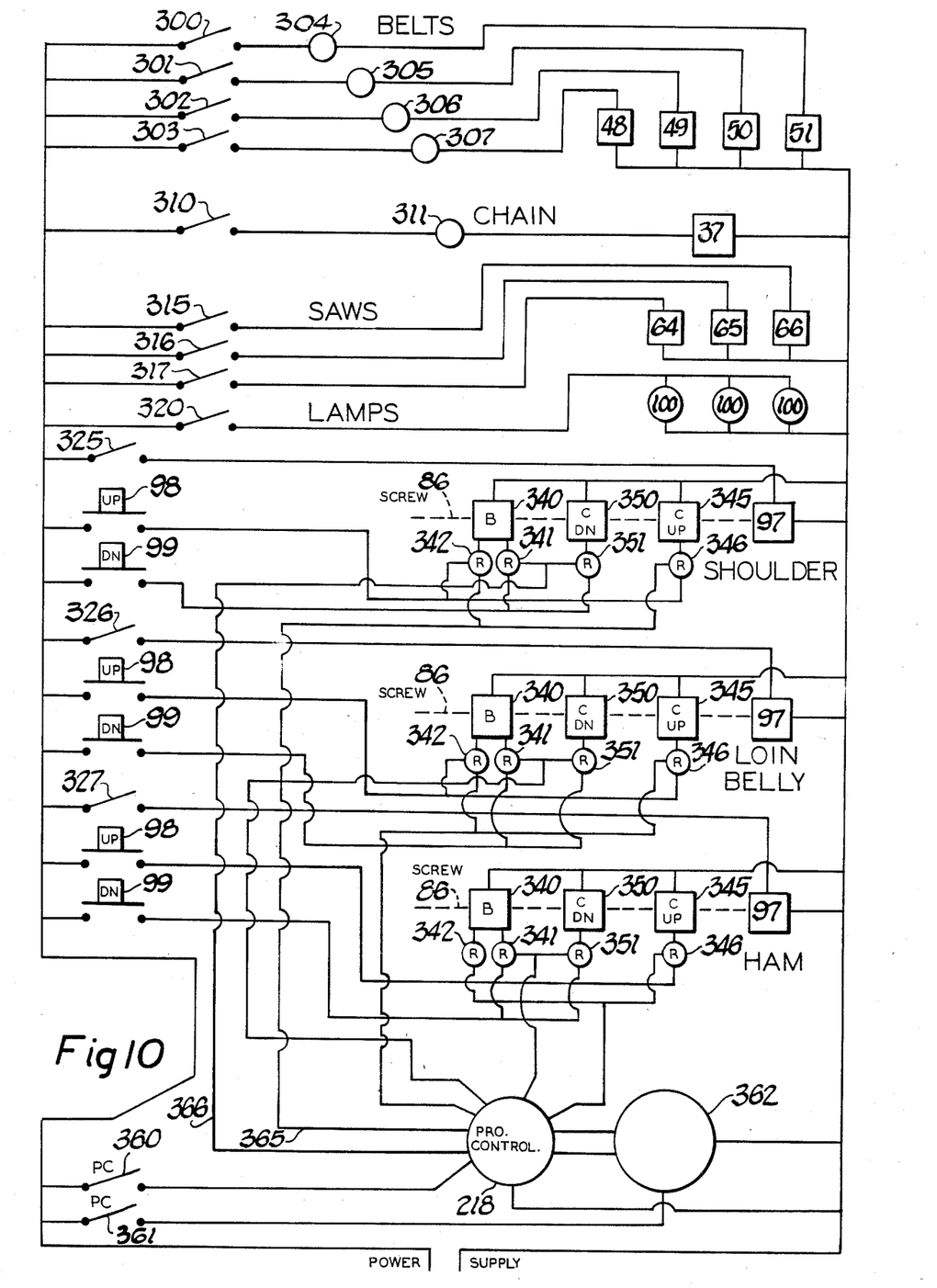
FIG. 10 is a wiring diagram of the manual control, the automatic control, and the operation of the apparatus.

Referring now to the wiring diagram, FIG. 10, the circuits to the belt drive selsyns 48, 49, 50, 51 are closed by the switches 300, 301, 302, 303, and rheostats 304, 305, 306, 307 regulate power to the selsyns 48, 49, 50, 51 for running the belts at the same speed. The circuit to the overhead rail conveyor chain drive selsyn 37 is closed by a switch 310 and a rheostat 311 regulates power to the selsyn 37 for running the chain 34 at the same speed as the belts.

The circuits to the motors of the saws 64, 65, 66 are closed by switches 315, 316, 317. The circuit to the black-line guide lamps 100 is closed by a switch 320. The circuits to the lead screw drive motors 97 are closed by switches 325, 326 and 327.

All the foregoing switches are closed during operation as the seleyns and motors run continuously. The guide lamp 100 switch is closed during manual control or for check under automatic control.

Each manually operated "up" botton 98 switch closes the circuits to the drive 95, brake 340 through relay 341 thereby releasing the normally gripping brake 340 and closes the circuit to the "up" clutch 345 to engage the normally disengaged "up" clutch 345 whereupon the lead screw drive motor 97 is drivingly connected to the lead screw 86. Upon release of the "up" button 98 the relays are deenergized, the "up" clutch 345 disengages drive, and the brake 340 engages holding the lead screw 86 stationary.

Each manually operated "down" button 99 switch closes the circuit to the drive 95, brake 340 through relay 342 thereby releasing the normally gripping brake 340 and closes the circuit to the "down" clutch 350 through relay 351 to engage the normally disengaged "down" clutch 350 whereupon the lead screw drive motor 97 is drivingly connected to the lead screw 86. Upon release of the "down" button 99 the relays are deenergized, the "down" clutch 350 disengages drive, and the brake 340 engages holding the lead screw 86 stationary.

Automatic Control

(Overview)

The cameras have multiple pixels which are aligned horizontally and vertically. When the camera is triggered and takes a pix of the front open side of the carcass, it records the features of the carcass horizontally and vertically. Thus features in a horizontal plane have a vertical position indicative of vertical level or height of the features.

The rows of horizontal pixels and the light and dark horizontal areas of the pix indicative of the features of the carcass are aligned with a vertical height scale in the pix indicative of ruler distance vertically. The pix provides a relative vertical height of the features but no selection of features.

The selection of the feature at which the desired cut of the saw is to be made and the conversion of the relative height of the selected features is extracted by the decision processor and made into data indicative of the needed height of the saw to make the next cut and to move the saw to make the desired cut on the carcass. This data is fed to the programmable controller which operates the circuits controlling the drive to move the saw to a vertical level at which to make the desired cut.

It is to be understood tht the desired cuts on a carcass for shoulders, loin-bellies and hams will not be at the same height or elevation for cuts on all carcasses but rather will be at different levels or heights depending on the length of the carcass hanging down from the gambrel from 48 to 82 inches with said cuts at levels proportional over a range of the differences due to the various lengths of the carcasses.

Automatic Operation

Figure 9:
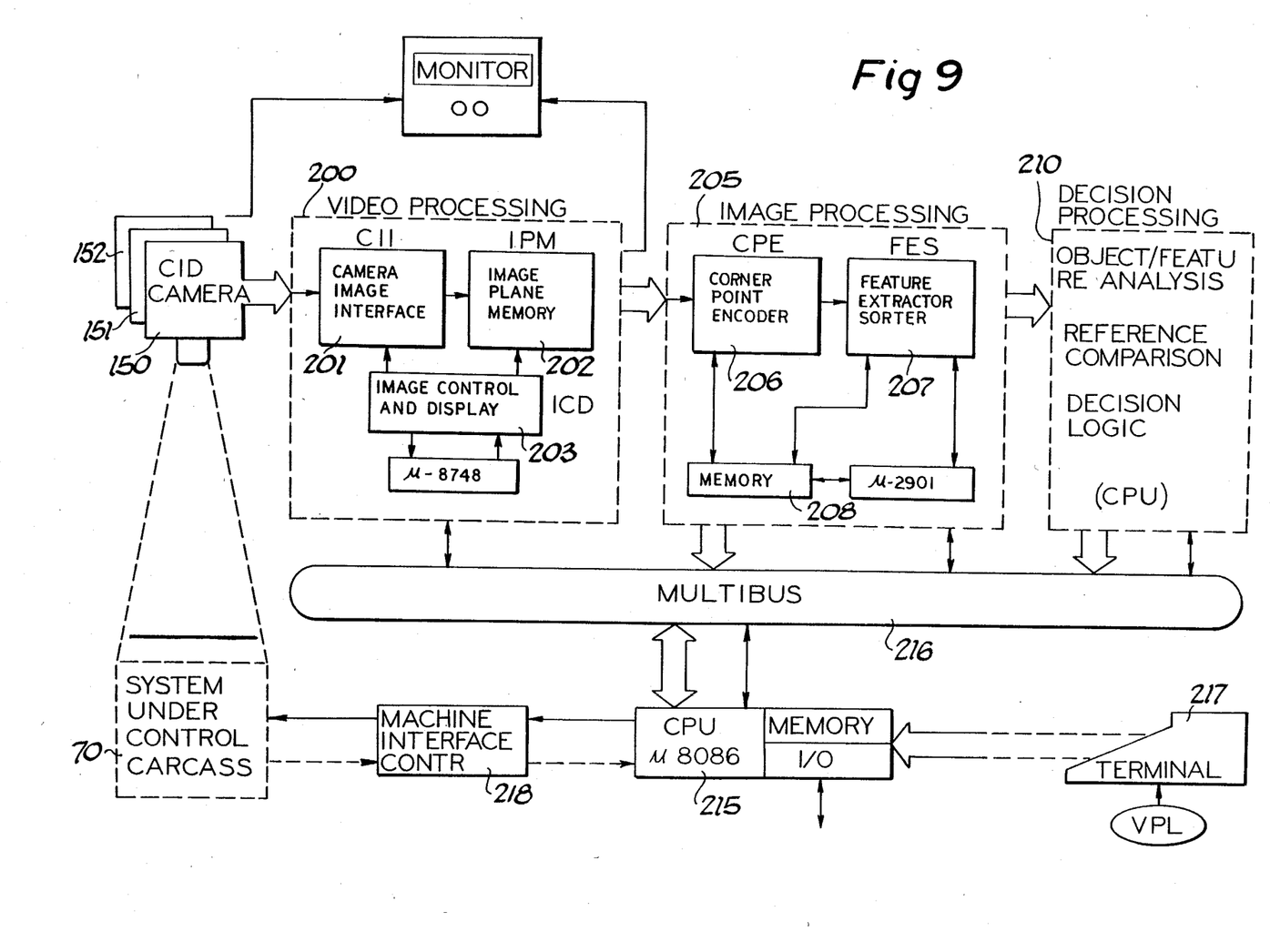
FIG. 9 is a block diagram of the hardware having firmware for automatic control of the location of saw cuts on carcasses.

FIG. 9 is a block diagram of the "Optomation II" decision processor plus cameras, monitor, terminal and machine interface to the system under control. They are purchased from the General Electric Company. The machine interface is a programmable controller also purchased from the General Electric Company. This equipment is well within the skill of those having ordinary skill in the art for understanding of the present inventive combination.

The charge injection device (CID) cameras 150, 151, 152 focus on the carcasses 70A, B, and C upstream of the saws 64, 65, 66 and are triggered by the photo electric cells 158, 159, 160 together with the strobes 154, 155, 156 to take a pix of the features of the carcasses respectively in their fields of view.

The pix are sent to the video processing section 200 which identifies a camera 150, 151 or 152. The camera image interface 201 receives the pix and the interpretations are stored in the image plane memory 202, both under the control of the image control and display 203 thus producing an image of the carcass features, and an identity of the camera which is indicative of the lead screw mechanism 60, 61, or 62 where the cut is to be made. This identity is carried throughout and given to the controller 218.

The image is fed to the image processing section 205 and there a corner point encoder 206 identifies the camera and codifies the features of the image such as the rib bones, the spaces therebetween, the aitch bone, stifle, joint, etc. The image is gridded as to height of the features as per the vertical count of the "X-row" pixels indicative of ruler vertical height. Given that the space between the second and third ribs lies at "X-row" No. 128 and the saw is in its last position at 118, the saw will have to be raised the equivalent of 10 "X-row" lines calibrated to be 1/5 inch each at the saw. Thus the saw has to be raised 10 one/fifth inch increments which is 2 inches at the saw or 4 turns of the lead screw 86 at ½ inch per turn.

This data is sent to the feature extractor sorter 207, extracted and sorted and stored in a memory 208 and given to decision processing section 210 which analyses the features of the image, provides reference comparison, and develops the decision logic such as the number of inches or fractions equivalent increments to cause the lead screw 86 to turn and the direction of turn to raise or lower the saw the desired distance including camera identity.

This data is put into the CPU section 215 via the multibus 216 and commands are formulated in conjunction with the software control, standards, and advisory data introduced by the VPL terminal 217 to the CPU section 215 where they are integrated with pix data decision logic from decision processor 210 and delivered together with camera identity to the machine interface 218 which is a programmable controller capable of closing the circuits to the brake drive 95 and a clutch at the identified camera and clock counting the 4 turns of the lead screw 86 at ½ inch per turn in the signalled direction to raise or lower the saw 64 two inches so as to correspond in height to the space between the 2nd and 3rd ribs of the carcass of the pix about to engage the saw 64 to make the shoulder 111 cut-off; to raise or lower the saw 65 with a processed pix of the aitch bone to make the loin-belly 112 cutoff, and/or to raise or lower the saw 66 with a processed pix of the stifle joint to make the ham 113 cut-off.

The 2 inch move of the shoulder saw 64 is exemplary as it requires a travel of about 24 inches; the loin-belly saw 65 needs a travel of about 12 inches; and the ham saw 66 needs a travel of about 5 inches—all to be able to make the shoulder, loin-belly and ham cuts respectively at the desired points on hog carcasses varying in length.

In automatic operation, the switches in the circuits to the selsyns and the motors are closed the same as in manual operation. The switch 320 in the circuit to the black-line guide lamp may be closed or open.

Program controller 218 switch 360 is closed and the main switch 361 to the entire electronic system 362 is closed supplying power throughout from the cameras to the controller 218.

Figure 6:
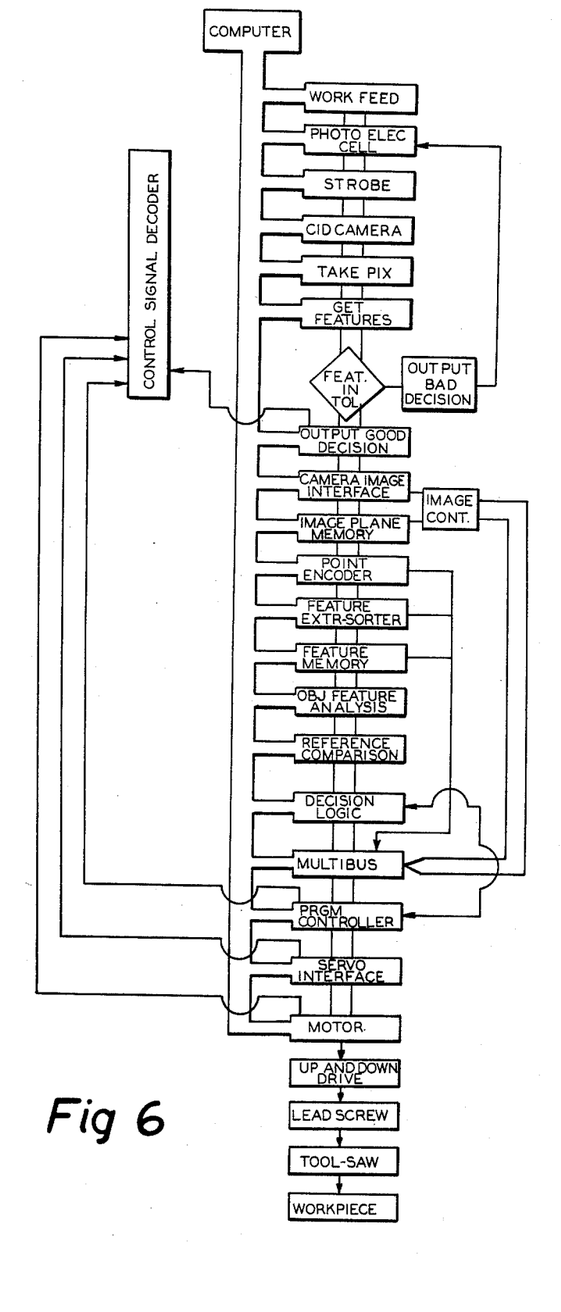
FIG. 6 is a flow sheet of the automation.

The camera 150, 151, 152 identify, such as camera 150, and the data as to up or down direction of lead screw rotation and number and/or fractions of turns to make is received by the CPU section 215 and controller 218 which responsively activate circuit 365 for up direction or circuit 366 for down direction and the number of turns and/or fractions of turns of lead screw 86 to be made to cause lead screw 86 to move nut 88 to bring the shoulder saw 64 to the level to make the desired cut-off of the shoulder 111. When cameras 151, 152, are identified like data is similarly supplied to make the loin-belly and ham cut-offs. Flow sheet, FIG. 6, shows the steps in detail.

Stations I, II, III may be of different lineal extent and the cameras 150, 151, 152 are staggered so as to provide their pixs at intervals different from one another for the same carcass and for a new carcass entering Station I.

The foregoing enables a person having ordinary skill in the art to make and use the invention unless barred by the existence of protective claims.

The disclosed and described method, process, and/or apparatus, singly and in combination, illustrate the invention, and it will be underatood that the scope of the following claims define the protection of the invention.

I claim:

1. Apparatus for processing animal carcasses which differ in length and vary as to height of feature at which a tool should do desired work with the carcasses hanging lengthwise vertically, comprising,
   an overhead rail,
   trolleys on said rail including means for hanging carcasses lengthwise vertically downwardly,
   a tool downstream under said rail for intercepting and performing work at a selected common feature of said carcasses,
   means driving said trolleys along said rail to carry carcasses past said tool,
   means for adjusting the vertical height of said tool to work on different carcasses with the same selected common feature lying at different vertical elevations, and
   control means for selectively activating said adjusting means to bring said tool to the height of the feature prior to each carcass moving past said tool whereby said tool does work on each carcass at the desired feature,
   at least one pair of opposed endless belts below said rail to steady the carcasses including,
   a first endless belt below said rail disposed on edge with a flat side vertical for bearing against a portion of the backs of carcasses,
   a second endless belt below said rail paired with said first belt disposed on edge with a flat side vertical for bearing against a portion of the fronts of carcasses in opposition to said first belt,
   said belts thereby holding carcasses between said belts steady as they move past said tool,
   rollers supporting said belts,
   at least one said roller imparting drive to said first belt, at least one said roller imparting drive to said second belt, and means rotating said drive rollers to move said belts at the same speed as said trolleys on said rail.

2. In apparatus as set forth in claim 1, said tool height adjusting means comprising, a lead screw held against axial movement, a nut on said lead screw moving axially up when said lead screw is rotated in the up direction and for moving axially down when said lead screw is rotated in the down direction, a motor having rotational direction of drive, drive control means having a control shaft connected between said motor and said lead screw, a first normally disengaged clutch on said control shaft for engaging motor drive via said control shaft to said lead screw in the rotational direction of said motor to rotate said lead screw in one angular direction to drive said nut in one vertical direction, such as up, a second normally disengaged reversing clutch on said control shaft for engaging drive via said control shaft to said lead screw in the reverse direction of said motor to rotate said lead screw in the reverse angular direction to drive said nut in the other vertical direction, such as down, means on said nut connected to said tool for moving said tool up and down with said nut, and means for selectively engaging each said clutch individually.

3. In apparatus as set forth in claim 2, said means for selectively engaging each said clutch individually, comprising, a first relay for engaging said first clutch to connect drive to said control shaft, a second relay for engaging said second clutch to connect drive to said control shaft, and means for selectively energizing said first and second relays for optionally driving one said clutch, including a first circuit to said first relay, a second circuit to said second relay, a first normally open manually actuated switch in said first circuit, and a second normally open manually actuated switch in said second circuit.

4. In apparatus as set forth in claim 1, a black-line guide lamp mounted at said tool for up and down movement with said tool;

said lamp being focused directly on the features of the carcass carcasses as they approach said tool; said black line lying at the same level as said tool directly indicating where the tool is and where the tool should be to engage the carcass when the selected feature of the carcass moves past said tool on said rail thereby providing a guide for manually selectively operating said switches to bring the projected black-line and tool to the feature on the carcass at which desired work by the tool is to be performed.

5. In apparatus as set forth in claim 3, a normally engaged brake on said control shaft downstream of said clutches, a first brake circuit, a first brake relay in said first brake circuit, said first brake circuit being integrated with said first switch for actuation with said first clutch, (A) to energize said first brake relay to release said brake when said first clutch is engaged; and (B) to allow said brake to engage to hold said lead screw in adjusted position when said first clutch is disengaged, a second brake circuit, a second brake relay in said second brake circuit, said second brake circuit being integrated with said second switch for actuation with said second clutch, (A) to energize said second brake relay to release said brake when said second clutch is engaged; and (B) to allow said brake to engage to hold said lead screw in adjusted position when said second clutch is disengaged, said brake circuits being integrated with said switches set forth in claim 3 for simultaneous synchronous operation with said clutches so as to release said brakes when said clutches are activated.

6. In apparatus as set forth in claim 3, apparatus for automatically controlling said circuits instead of said manual switches to provide automatic control of said circuits, comprising;

an intelligent vision camera for taking a pix of carcass features focused in an area to be occupied by a carcass exposing its features to said camera, a photo electric cell actuated when a carcass is in said area triggering said camera to take a pix of said carcass features, a vertical height grid on said pix indicative of the relative height of said features, an identification of said camera on said pix means for video processing said pix including a camera image interface, an image plane memory, and image control and display, means for image processing of said video processing data including corner point encoding of the features of a carcass, a feature extractor sorter, and a feature memory, means for interpreting said image processing data including feature analysis, reference comparison, decision logic, and a feature memory, means for developing said interpreted data including system execution of software, a core memory, and a programmable controller, means supplying said use data to said programmable controller, means for supplying said programmable controller with user program, input-output means receiving signals from said programmable controller, a multibus interconnecting said image plane memory, core memory, execution software and input-output to one another.

7. In apparatus as set forth in claim 1, said control means being automated and comprising, an intelligent vision camera having a field of view focused on each individual carcass as it travels on said rail past said camera, said camera directly reading the features of the carcass at which the cuts are to be made, a photo-electric cell triggering said camera to take a pix when each carcass is in the field of view of said camera, to provide an image of at least one selected feature of each said carcass, multiple pixels in said camera producing an image of said carcass indicative of the features of said carcass including their vertical level, a camera image interface and a camera image plane memory processing each said pix of each carcass, means encoding said pix of the carcass, means extracting the desired features of said pix of the carcass to be cut and the vertical level of the features, means performing feature analysis, comparison with preprogrammed reference information and subsequent appropriate output decisions including determining the decision logic of required distance of vertical movement of said saw from its last position to the now programmed position including the number of revolutions of said lead screw including a fraction to position the saw at the vertical level corresponding to the vertical level of the feature at which the desired cut is to be made.

8. In apparatus as set forth in claim 4, a short stand at the shoulder cut station, a medium stand at the loin-belly cut station, and a high stand at the ham cut station; said stands being coordinated in height to elevate the manual operator to a sight-level on a horizontal plane even with the cut to be made at each saw facilitating accuracy in adjusting the vertical position of the black line of said lamp projection on said carcass at the location of the feature at which the cut is to be made by the saw.

* * * * *